(12) United States Patent
Wu et al.

(10) Patent No.: US 8,081,628 B2
(45) Date of Patent: Dec. 20, 2011

(54) MULTICAST DISTRIBUTION TREE ESTABLISHMENT AND MAINTENANCE IN A WIRELESS MULTI-HOP RELAY COMMUNICATION SYSTEM

(75) Inventors: Mingquan Wu, Princeton Junction, NJ (US); Hang Liu, Yardley, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/450,669

(22) PCT Filed: Apr. 4, 2007

(86) PCT No.: PCT/US2007/008498
§ 371 (c)(1),
(2), (4) Date: Oct. 5, 2009

(87) PCT Pub. No.: WO2008/123850
PCT Pub. Date: Oct. 16, 2008

(65) Prior Publication Data
US 2010/0046400 A1    Feb. 25, 2010

(51) Int. Cl.
*H04L 12/28* (2006.01)
(52) U.S. Cl. .................................. 370/390; 370/432
(58) Field of Classification Search .................. None
See application file for complete search history.

(56) References Cited

U.S. PATENT DOCUMENTS

2005/0249142 A1*  11/2005  Kim et al. ................. 370/312
2006/0250999 A1   11/2006  Zeng et al.

FOREIGN PATENT DOCUMENTS

| WO | WO2006037362 | 4/2006 |
| WO | WO2007019672 | 2/2007 |

OTHER PUBLICATIONS

International Search Report, Oct. 26, 2007.

* cited by examiner

*Primary Examiner* — Chirag Shah
*Assistant Examiner* — Otis L Thompson, Jr.
(74) *Attorney, Agent, or Firm* — Robert D. Shedd; Joseph J. Opalach; Catherine A. Cooper

(57) ABSTRACT

A method and apparatus for multicast communications in a multi-hop relay network are described including sending an extended request message, wherein the request message includes a multicast connection identification, multicast distribution tree information and a path identification and receiving an extended response message. Correspondingly, a method and apparatus for multicast communications in a multi-hop relay network are described including receiving an extended request message, wherein the request message includes a multicast connection identification, multicast distribution tree information and a path identification and sending an extended response message.

24 Claims, 7 Drawing Sheets

MULTICAST DISTRIBUTION TREE ESTABLISHMENT AND MAINTENANCE IN A WIRELESS MULTI-HOP RELAY COMMUNICATION SYSTEM

This application claims the benefit, under 35 U.S.C. §365 of International Application PCT/US2007/08498 and filed Apr. 4, 2007, which was published in accordance with PCT Article 21(2) on Oct. 16, 2008, in English.

FIELD OF THE INVENTION

The present invention relates to wireless multi-hop communication systems, and in particular to multicast distribution tree establishment and maintenance for mobile wireless multi-hop communication systems.

BACKGROUND OF THE INVENTION

Multi-hop wireless networks (including mobile wireless multi-hop relay communication networks/systems) are emerging as a promising technology that has applications in metro-area Internet access. As used herein, "/" denotes alternative names for the same or similar components or structures. That is, a "/" can be taken as meaning "or" as used herein. In the present invention, infrastructure multi-hop wireless relay networks are considered. Infrastructure multi-hop wireless relay networks consist of one or more multi-hop relay base stations (MR-BSs), relay nodes/stations (RS) and mobile stations (MS)/end devices. Relay nodes are part of the network infrastructure and are connected to base stations to form a backhaul multi-hop wireless network. A base station may connect to other networks such as the Internet. The mobile stations/end devices associate with/connect to/attach to a MR-BS or RS to obtain network access.

In the prior art, a scheme to establish a unicast path between MR-BS and a RS has been proposed. When RS1 enters the network, after conducting the initial ranging, a path P1 is established between MR-BS and RS1, P1={MR-BS, RS1}. A path identification (ID) is assigned to P1. When RS2 enters the network, a path P2 is established between MR-BS and RS2, P2={P1, RS2}. The path information is communicated to all the relay nodes (RSs) along the path. When MS1 enters the network, after the initial ranging, MR-BS knows that MS1 is associated with RS2, MR-BS binds MS1's basic and primary management connection identification (CID) to/with P2. MR-BS also notifies RS1 and RS2 to bind MS1's basic and primary management CID with/to P2. All the unicast traffic flows that start or end with MS1 have their CIDs bound with/to P2. For all the RSs in the system, there is a unique path that leads from MR-BS to each RS. For each MS in the system, their basic and primary management CID is bound to a path. For those MSs that connect directly to the MR-BS, P0={MR-BS} is defined and their CID is then bound to P0. It should be noted in the unicast scheme that a path can be bound to multiple CIDs, but each CID is only bound to one path.

Multicast and broadcast services (MBS) are very important for mobile wireless networks. In single-hop wireless communication systems, such as IEEE 802.16e, MBSs are associated with multicast and broadcast service flows. A multicast and broadcast service flow is not dedicated to a specific end device/mobile station/mobile device. For ease of notation, end devices are denoted as mobile stations (MSs) herein but it should be noted that end devices also include laptops, PDAs, cell phones and any other such mobile devices. If one or more MSs send a request to the base station (BS) in order to receive multicast service, a multicast connection is instantiated for a multicast service flow, a connection identification (CID) number is assigned to this multicast connection. The BS then creates a multicast traffic connection with each MS requesting the multicast and broadcast service using the same CID. Each multicast service data unit (SDU) is transmitted only once by the BS, and all MSs requesting the multicast service are able to receive the SDU. Multicast SDUs are sent directly from the BS to the MSs, no multicast distribution tree needs to be established for single hop wireless communication systems.

Multicast offers efficient utilization of network resources to deliver data from a source to multiple destination nodes. In a wireless multi-hop relay (MR) system, one or more relay stations (RS) may exist between a multi-hop relay base station (MR-BS) and a MS. When a MS associated with/attached to/connected to a RS joins a multicast application, multicast SDUs/packets/frames need to be forwarded from the MR-BS to the RS with which the MS is associated. Note that only a subset of nodes in a wireless MR system may join a particular multicast service/group to transmit and receive the multicast SDUs for this multicast service. A multicast service/group has its own multicast connection ID (MCID) for communications among the multicast service members. One way to transmit SDUs/packets/frames from a MR-BS to one or more RSs is to broadcast the multicast SDUs/packets/frames to every RS in the network no matter whether they need to receive the packets/frames/SDUs or not. Another approach to solve the problem of how to transmit SDUs/packets/frames from a MR-BS to RSs is to encapsulate multicast SDUs and unicast them individually to each of the RSs, that are associated with those MSs that have requested the multicast service. In this scheme, however, the MR-BS or the intermediate RS may need to transmit the same SDU multiple times, thus also incurring substantial cost in terms of bandwidth.

It would advantageous to have a method to establish and maintain a multicast distribution tree to distribute multicast SDUs/packets/frames along each branch of the multicast distribution tree. In this way, a multicast SDU is transmitted only once by a MR-BS to an RS and then only once by that RS to a further RS or to the MSs. The multicast SDU is transmitted only to the RSs associated with the MSs that have requested the multicast and broadcast service. Thus, the bandwidth utilization for multicast is improved.

The IP layer multicast routing protocols have been used to discover and establish the multicast tree for a multicast group in wired and wireless networks. The IP layer multicast routing protocols are based on the IP addresses. The Protocol Independent Multicast—Sparse Mode (PIM-SM) and the Protocol Independent Multicast—Dense Mode (PIM-DM) are two IP multicast routing protocols. PIM-DM employs a flooding and then pruning approach, which results in large overhead. PIM-SM employs a join/prune approach, which is more efficient in terms of network resource utilization. However, these protocols are designed for distributed and connectionless Internet communications, where the establishment and teardown of multicast tree routing is conducted by the multicast group members. In contrast, in the present invention, the establishment and teardown of multicast distribution tree routing is controlled by the base station (MR-BS).

Multicast routing protocols have also been proposed for wired or wireless mesh networks based on layer 2 media access control (MAC) address. However, the establishment and teardown of multicast tree in these protocols is also distributively controlled by the multicast group members.

The network structure of a wireless multi-hop relay network is quite different from the wired Internet and wired or wireless mesh networks. In a multi-hop relay network, the BS is a central control point. The multi-hop relay network has tree-type wireless connections with the BS as the root. The multi-hop relay network is a connection-oriented network, compared to mesh and connectionless wired or wireless networks. The SDUs/packets/frames are transmitted based on the connection ID, not the destination and source addresses as in wired or wireless mesh networks and Internet communications. The connection ID is dynamically assigned by the base station. The multicast routing protocols used for wired or wireless mesh networks and Internet communications are not applicable for a multi-hop relay network. Therefore, multicast mechanisms for wireless multi-hop relay networks are needed to establish, maintain, and tear down multicast distribution trees for efficient multicast communications using multicast connection ID.

SUMMARY OF THE INVENTION

The present invention teaches two embodiments for multicast distribution tree establishment and maintenance for mobile wireless multi-hop relay communication networks, such as an IEEE 802.16 WiMax based multi-hop network. In particular, signal mechanisms and data structures are described that are maintained by the MR-BS and RSs in order to build a multicast distribution tree to efficiently distribute multicast and broadcast data from the source (MR-BS) to all the MSs that join the multicast application in a multi-hop relay network. A unicast communication is a one-to-one communication between two entities. A multicast communication is a one-to-many communication between an entity and a plurality of other entities in the communication system. A broadcast communication is a communication between one and all other entities in the communication system.

Herein two alternative embodiments including signaling mechanisms and data structures to establish and maintain a multicast distribution tree in a mobile multi-hop relay network are described. The number of relay hops and the number of RSs in a multi-hop relay network are relatively small so a centralized control mechanism is adopted wherein the MR-BS assigns the multicast connection ID, determines the structure of the multicast distribution tree. The information of the multicast distribution tree is then communicated to all the RSs that are included in the multicast distribution tree. The multicast routes/paths are established along the multicast distribution tree by the MR-BS so that the data SDUs/packets/frames can be forwarded along the multicast distribution tree branches from one source to multiple destinations based on the multicast connect ID. A multicast distribution tree may include multiple multicast routes/paths.

A method and apparatus for multicast communications in a multi-hop relay network are described including sending, by a multi-hop relay base station, an extended request message, wherein the extended request message includes a multicast connection identification, multicast distribution tree information and a path identification and receiving, by said multi-hop relay base station an extended response message, wherein said extended response message is one of a response to said extended request message for an addition of said path connection, a response to said extended request message for a deletion of said path connection and a response to said extended request message to change service flow parameters of said path connection. Correspondingly, a method and apparatus for multicast communications in a multi-hop relay network are described including receiving, by a relay station, an extended request message, wherein said request message includes a multicast connection identification, multicast distribution tree information and a path identification and sending, by said relay station, an extended response message, wherein said extended response message is one of a response to said extended request message for an addition of said path connection, a response to said extended request message for a deletion of said path connection and a response to said extended request message to change service flow parameters of said path connection.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
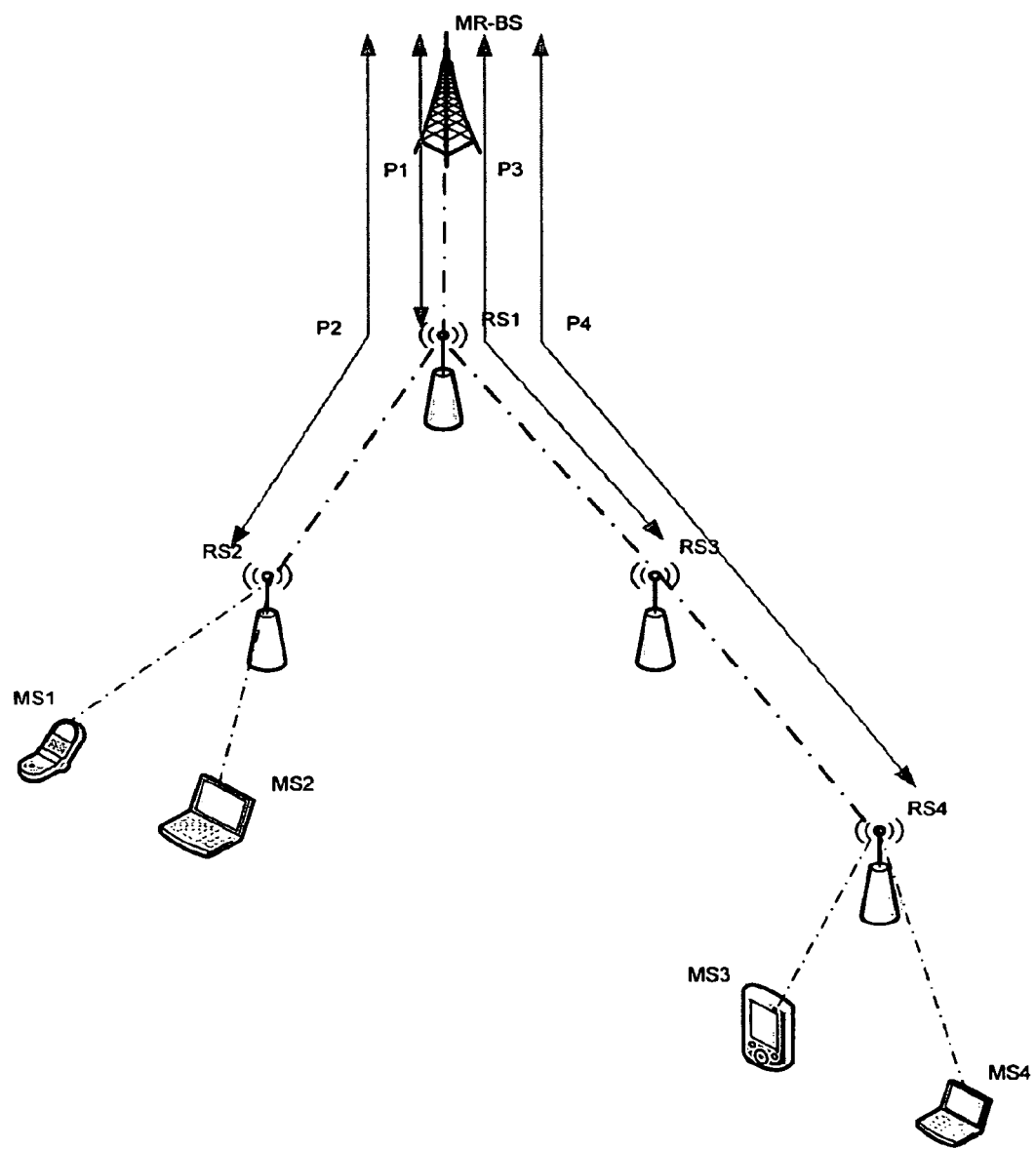
FIG. 1 is a schematic diagram of an exemplary multi-hop relay system.

FIG. 1 is a schematic diagram of an exemplary multi-hop relay system. In this example, MS1 and MS2 are connected to the MR-BS through RS1 and RS2, while MS3 and MS4 are connected to the MR-BS through RS1, RS3 and RS4. When one or more mobile node/station/device requires MBS, a multicast distribution tree is established, multicast SDUs/packets/frames are forwarded along the branches of the multicast distribution tree to the RS, to which MS nodes are associated. This RS may or may not be the last RS along a branch of the multicast distribution tree to the MSs. There may be multiple RSs along the path. The RSs further forwards the multicast SDUs to its associated MSs. A method is described herein to establish and maintain a multicast distribution tree that connects MR-BS and RSs using extended dynamic service (DSx) messages such as DSA, DSC, DSD, where DSA stands for the dynamic service addition, DSD stands for the dynamic service deletion and DSC stands for the dynamic service message change. For convenience, an "*" is added at the end of a dynamic service message to represent the extended version of that message. For example, DSA-REQ represents the legacy dynamic service addition request message for a single-hop network and DSA-RSP represent the legacy dynamic service addition response message to a DSA-REQ for a single-hop network. DSA-REQ* represents the extended dynamic service addition request message for the multi-hop relay network in accordance with the present invention. This message adds a path for a multicast and broadcast service. Correspondingly, DSx-RSP* represents the extended dynamic service response to a DSx-REQ*. An enhanced/extended signaling mechanism is used only for communications between the MR-BS and the RSs. Signaling between the MR-BS and the MSs is not modified by the present invention.

In the multicast scheme of a wireless multi-hop relay communication system/network of the present invention, when a MS requests a unicast service, the unicast CID is assigned by the base station and is bound to a path through the signaling messages between the base station and relay nodes along the path. This is not the case for the multicast. In multicast, a multicast CID (MCID) may be bound to multiple paths. Multiple paths form a multicast distribution tree. In addition, two or more MSs may request the same multicast service. When the first MS requests the multicast service, a MCID is assigned by the base station and the path is bound to the MCID. However when the other MSs request the same multicast service, the MCID does not need to be assigned. Furthermore, if the other MSs use the same path for this multicast service, the binding of the MCID and the path does not need to re-occur. Therefore, the establishment of multicast service and the establishment of unicast service are different. The method for establishing unicast service cannot be used for establishing multicast service. The present invention is for multicast, specifically, the method to establish and tear down the multicast service and the binding of MCID and path in the multicast distribution tree.

In FIG. 1, after RS1, RS2, RS3 and RS4 enter the network, MR-BS establishes the following paths:

P0={MR-BS}, P1={P0, RS1}, P2={P1, RS2}, P3={P1, RS3}, P4={P3, RS4}

When a MR-BS or a MS wants to initiate a multicast and broadcast service (MBS), the entity desiring to initiate MBS sends a DSA-REQ message to specify that it wants the MBS. Then a multicast distribution tree is established for this MBS. The method in accordance with the present invention for establishing multicast distribution tree is now described.

In the first embodiment of the present invention, a multicast distribution tree consists of multiple paths. When a MR-BS receives a MBS request from a MS, it checks whether the requested MBS has been created. If not, the MR-BS creates a multicast distribution tree for this MBS and allocates a multicast CID (MCID) to it. The MR-BS also determines the path to carry this multicast service flow to the requested MS. The MR-BS creates the mapping/binding between the determined path and the MCID. The MR-BS populates the path and binds the MCID to all the RSs along the path. Each RS along the path stores the path identification (ID) and MCID binding information for forwarding multicast data with the MCID. The MR-BS adds this path to the multicast distribution tree and records the number and identification information of the MSs using the path for multicast communications.

If the multicast distribution tree has been created and an MCID has been allocated to this MBS, the MR-BS determines the path to carry this multicast service flow to the requesting MS. If the path is not in the multicast distribution tree, the MR-BS creates the mapping/binding between the determined path and the MCID. The MR-BS forwards the path and MCID binding information to all the RSs along the path. Each RS stores the path-MCID binding information for forwarding multicast data with the MCID. The MR-BS adds this path to the multicast distribution tree and record the number and identification information of the MSs using the path for the multicast communications. If the path is already in the multicast distribution tree (due to the request of another MS using the same path), the MR-BS simply updates the number and identification information of the MSs using the path for multicast communications.

An example is used to illustrate the process of multicast distribution tree establishment. In FIG. 1, when MS1 wants a MBS, MS1 sends a DSA-REQ to the MR-BS. This message is received by RS2 and forwarded to MR-BS along path P2. If this MBS does not exist in the multi-hop relay network, (i.e. MS1 is the first entity to initiate this MBS) upon receiving this message, the MR-BS creates a multicast connection and assigns a multicast CID to this multicast connection. For convenience, this multicast CID is denoted as MCID. The MR-BS creates a multicast distribution tree for this MBS. A data structure may also be created to store the information for the multicast distribution tree in the MR-BS. The multicast distribution tree data structure includes the MCID, the number of (P, N) pairs in the multicast distribution tree, and a variable number of (P, N) pairs, {MCID, # of (P, N) pairs, (P1, N1), (P2, N2), . . . }. In the (P, N) pair, P represents a path between the MR-BS and a RS, and N represents the number of MSs that are associated with/attached to/connected to the RS and receive this MBS. That is, (Px, Nx) means Nx MSs are receiving the MBS with the MCID through the path Px. The MR-BS also maintains the identification information such as the basic and primary CIDs of the MSs that use the path for the MBS.

The MR-BS determines the path(s) to be used to carry the MBS flow and starts adding this path to the multicast distribution tree. For example, the MR-BS knows that MS1 is connected to MR-BS through path P2. Path P2 is added to the multicast distribution tree. The MR-BS sends a DSA-REQ* message along the path P2. The DSA-REQ* message includes the path ID (i.e., P2) for carrying this multicast service flow, the MCID for this multicast service flow and optionally the service flow parameters including quality of service (QoS) information corresponding to the multicast service flow. Upon receiving the DSA-REQ* message, a RS along the path obtains the mapping between the MCID and the path ID and binds the MCID to the path ID. The binding/mapping between the path ID and MCID is used to route the traffic for the specified multicast service flow. After a RS binds to MCID to the path ID, if it is not the last RS of this path, it forwards the DSA-REQ* message to the next hop RS along the path. The next hop node processes the message in the same manner. When DSA-REQ* reaches the last RS of the path, the last RS binds the MCID to the path ID. The last RS sends a DSA-RSP* to MR-BS through the reverse path to confirm all RSs along the path have bound the MCID to the path ID. The intermediate RSs updates the DSA-RSP* and forwards it to the MR-BS. In this example, RS1 and RS2 bind the MCID to P2 and RS2 sends a DSA-RSP* message back to MR-BS. The MR-BS adds P2 to the tree with the MCID. The MR-BS also records the number and identification information of the MSs that have requested a multicast connection through this path. For convenience, the multicast distribution tree identification is denoted as tree-MCID. If MS1 is the only MS that requested this MBS through P2, the MR-BS assigns a multicast distribution tree identification (tree-MCID) and records the tree-MCID={MCID,1,(P2, 1)}. The MR-BS then sends MS1 a DSA-RSP message notifying MS1 that a connection MCID has been established. MS1 acknowledges with a DSA-ACK message. Note that MS1 has no knowledge of the multicast distribution tree. However, if the MR-BS cannot establish multicast distribution tree for the requested MBS (e.g. the service flow parameters cannot be satisfied), the MR-BS sends a DSA-RSP to the MS node denying the MBS.

If MS2 also wants the same MBS, it sends a DSA-REQ request for the same MBS to the MR-BS. The DSA-REQ request is received by RS2 and forwarded to MR-BS along path P2. Upon receiving the DSA-REQ request for the MBS from MS2, the MR-BS determines that the multicast service flow for this MBS has been created and its MCID has been assigned. Furthermore, the MR-BS determines that path P2 is to be used to carry this multicast service flow to MS2 and path P2 has been added to the multicast distribution tree and bound to this MCID. Based on this determination, the MR-BS does not send a DSA-REQ* to the RSs along path P2. MR-BS updates the multicast distribution tree information corresponding to tree-MCID to indicate that two MSs use path P2 for this MCID, i.e., the multicast distribution tree is {MCID, 1, (P2, 2)}. The MR-BS sends MS2 a DSA-RSP message notifying MS2 that a connection MCID has been established. MS2 acknowledges the DSA-RSP message with a DSA-ACK message.

If MS3 also wants the same MBS, it sends a DSA-REQ request for the same MBS to the MR-BS. The DSA-REQ request is received by RS4 and forwarded to MR-BS along path P4. Upon receiving the DSA-REQ request for the MBS from MS3, the MR-BS knows that the multicast service flow for this MBS has been created and the MCID has been allocated to this MBS. Furthermore, the MR-BS determines that path P4 is to be used to carry this multicast service flow to MS3. However, path P4 has not been added to the multicast distribution tree and bound to this MCID. The MR-BS sends a DSA-REQ* message along path P4. The DSA-REQ* message includes the path ID to carry this multicast service flow (i.e., P4), the MCID and optionally the service flow parameters. Upon receiving the DSA-REQ* message, each RS along the path obtains the mapping between the MCID and the path ID and binds the MCID to the path identification (i.e., P4 here). The last RS of path P4 (RS4 here) sends a DSA-RSP* to MR-BS through the reverse path. The intermediate RSs update the DSA-RSP* and forward it to the MR-BS. The MR-BS updates the tree information by adding path P4 to the tree with the MCID. The MR-BS also updates the number and identification information of the MSs that have requested a multicast connection through path P4. If MS3 is the only MS that requested this MBS through path P4, the MR-BS updates the tree-MCID={MCID, 2, (P2, 2), (P4, 1)}, indicating that two MSs along path P2 and one MS along path P4 have requested the MBS. The MR-BS then sends MS3 a DSA-RSP message notifying MS3 that a connection MCID has been established. MS3 acknowledges the DSA-RSP message with a DSA-ACK message.

Note that for MR-BS and RS1, the MCID is bound to both paths P2 and P4. A multicast CID can be bound to multiple paths for a multicast service flow. This MCID and path ID mapping/binding information is used for the MR-BS and RSs to update the routing table and locate the next hop nodes for a multicast distribution tree. This information is used for scheduling when multicast SDUs need to be forwarded along the multicast distribution tree. For example, when MR-BS needs to forward a SDU of the MCID, the MR-BS determines that the MCID is bound to P2 and P4. Since both paths (P2 and P4) have the same initial hop RS1, the SDU is forwarded to RS1 by the MR-BS. When RS1 receives a multicast SDU of the MCID, RS1 determines that the MCID is bound to both P2 and P4. Now, the next hops for P2 and P4 are RS2 and RS3, respectively. RS1 transmits the multicast SDU only once to RS2 and RS3 simultaneously according to a certain schedule. Both RS2 and RS3 receive the SDU at the same time.

Figure 2:
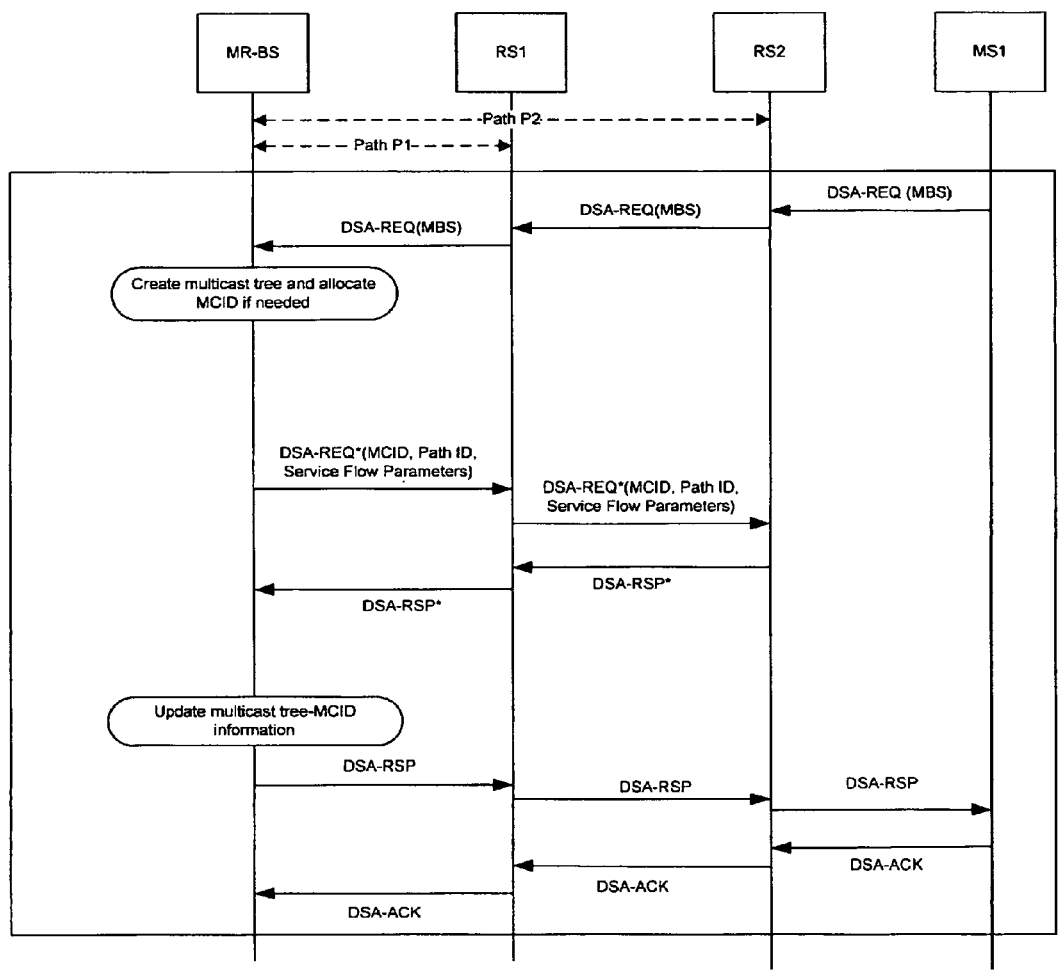
FIG. 2 is a message flow/ladder diagram to add a path to a multicast distribution tree in accordance with an exemplary embodiment of the present invention.

FIG. 2 is a message flow/ladder diagram to add a path to a multicast distribution tree in accordance with an exemplary embodiment of the present invention. The example given above will help understand FIG. 2. When a MS wants to have MBS, it sends a DSA-REQ message to the MR-BS to add the MBS. This is the same as requesting that a legacy service flow be created between the requesting MS and the MR-BS. The MR-BS receives this request and if this is the first MS that wants the MBS, then the MR-BS creates a multicast distribution tree and allocates/assigns a MCID (if needed). If the path Px between the requesting MS and the MR-BS already exists in the multicast tree-MCID then the MR-BS does not need to add path Px to the tree-MCID and the tree-MCID information is updated and the MS is informed using legacy service flow message DSA-RSP. If path Px needs to be added to the multicast distribution tree, then the MR-BS sends a DSA-REQ* message to each RS along the path using the reverse path information from the DSA-REQ message it received from the requesting MS. The DSA-REQ* message includes the MCID, path ID, multicast distribution tree information and optionally service flow parameters. The last RS along path Px responds with a DSA-RSP* message indicating that the path has been added to the tree-MCID including binding the path ID and the MCID. The legacy flow messages are then followed. The legacy flow message DSA-RSP is used by the MR-BS to respond to the requesting MS to indicate that the MS's request for MBS has been accepted. The MS then acknowledges to the MR-BS that the MS has received the MR-BS's acceptance of its request for MBS by sending a DSA-ACK message. This last set of legacy service flow messages between the MR-BS and the requesting MS also serves to update the tree-MCID in the event that path Px already exists.

Figure 3A:
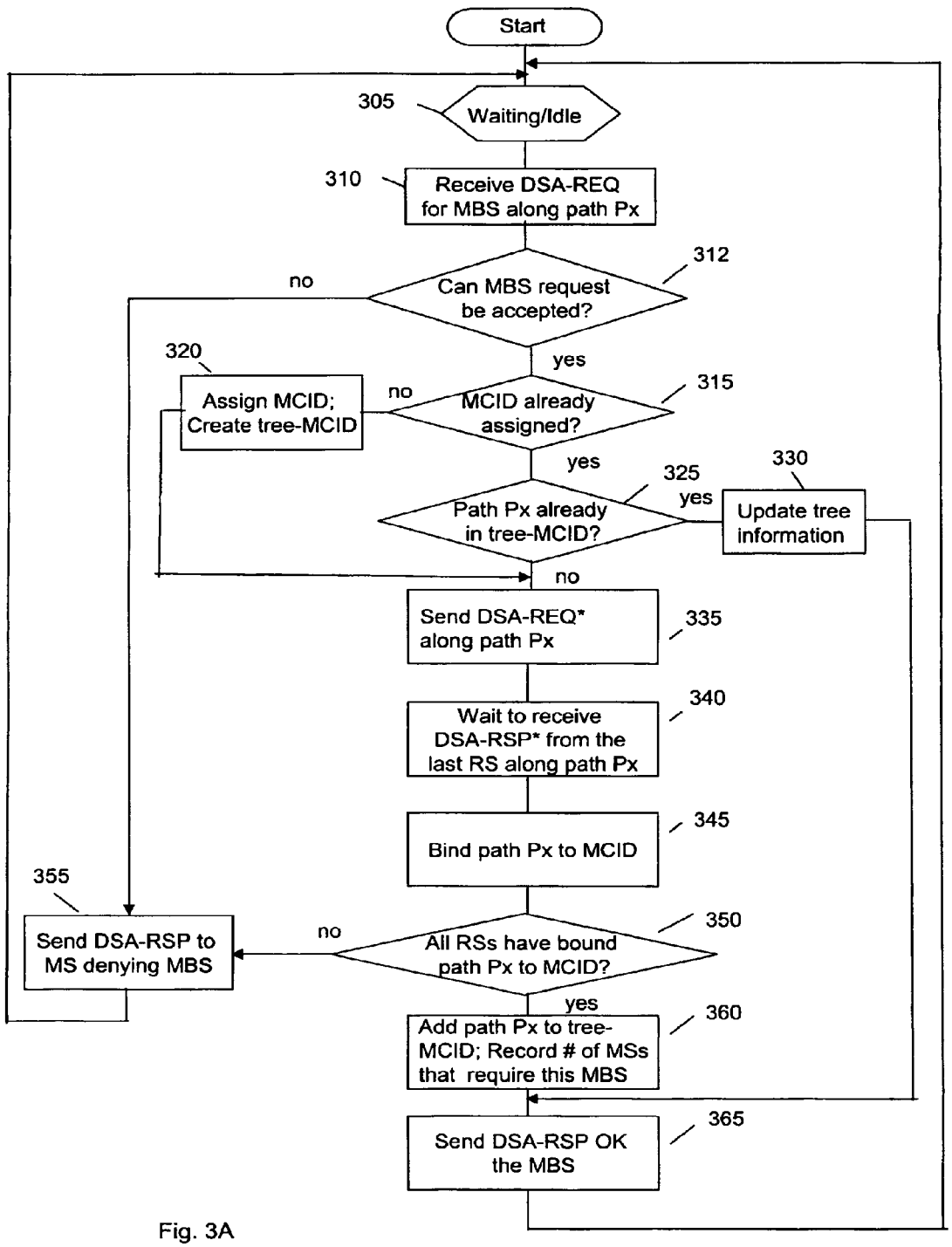
FIG. 3A is a flowchart of the method in accordance with the present invention for a multi-hop relay base station to add a path to a multicast distribution tree for a multicast and broadcast service.

FIG. 3A is a flowchart of the method in accordance with the present invention for a MR-BS to add a path for multicast and broadcast service. The MR-BS is in a wait/idle loop 305 until it receives a dynamic service request. The MR-BS receives a DSA-REQ for a MBS along a path Px at 310. The MR-BS determines if the MBS request can be accepted at 312. If it cannot be accepted, the MR-BS sends a DSA-RSP message to the requesting MS to deny the MBS request. If the MBR service request can be accepted, the MR-BS determines whether the MCID is already assigned for this MBS at 315. If the MCID is not already assigned then an MCID is selected and assigned, and the tree-MCID is created at 320. If the MCID is already assigned, then the MR-BS determines if path Px is already in the multicast distribution tree (tree-MCID) at 325. If path Px is already in the tree-MCID then the multicast distribution tree information is updated at 330. The method then proceeds to 365 (see below). Because MR-BS knows that the MS is connected to MR-BS through path Px, the MR-BS then sends a DSA-REQ* message along the path Px at 335. The DSA-REQ* message includes the path identification of Px, the MCID, multicast distribution tree information and optionally service flow parameters corresponding to the multicast service flow. The MR-BS then waits to receive DSA-RSP* messages from the last RS along path Px at 340. Each RS along the path binds the MCID to the path identification and forwards the DSA-REQ* towards the last RS along path Px (not shown). The last RS of path Px responds with a DSA-RSP* and sends DSA-RSP* along the reverse path Px to the MR-MS. Each RS along the path updates the DSA-RSP* message and forwards the updated DSA-RSP* message to the MR-BS. When the MR-BS has received the DSA-RSP* from the last RSs along path Px, the MR-BS attempts to add path Px to the tree-MCID at 345. MR-BS determines if all the RSs along path Px have been added/bound to the MCID at 350. If it was not possible to add/bind path Px to the MCID, then a DSA-RSP message is sent to the MS to deny the MBS request at 355. The MR-BS returns to the wait/idle state 305. If all RSs have been added/bound to the MCID then path Px is added to the tree-MCID at 360. The MR-BS also records the number and identification information of the MSs that requested a multicast connection through this path. The MR-BS sends a DSA-RSP message to the MS indicating that the request for MBS has been accepted at 365. The method then returns to the wait/idle state 305.

Figure 3B:
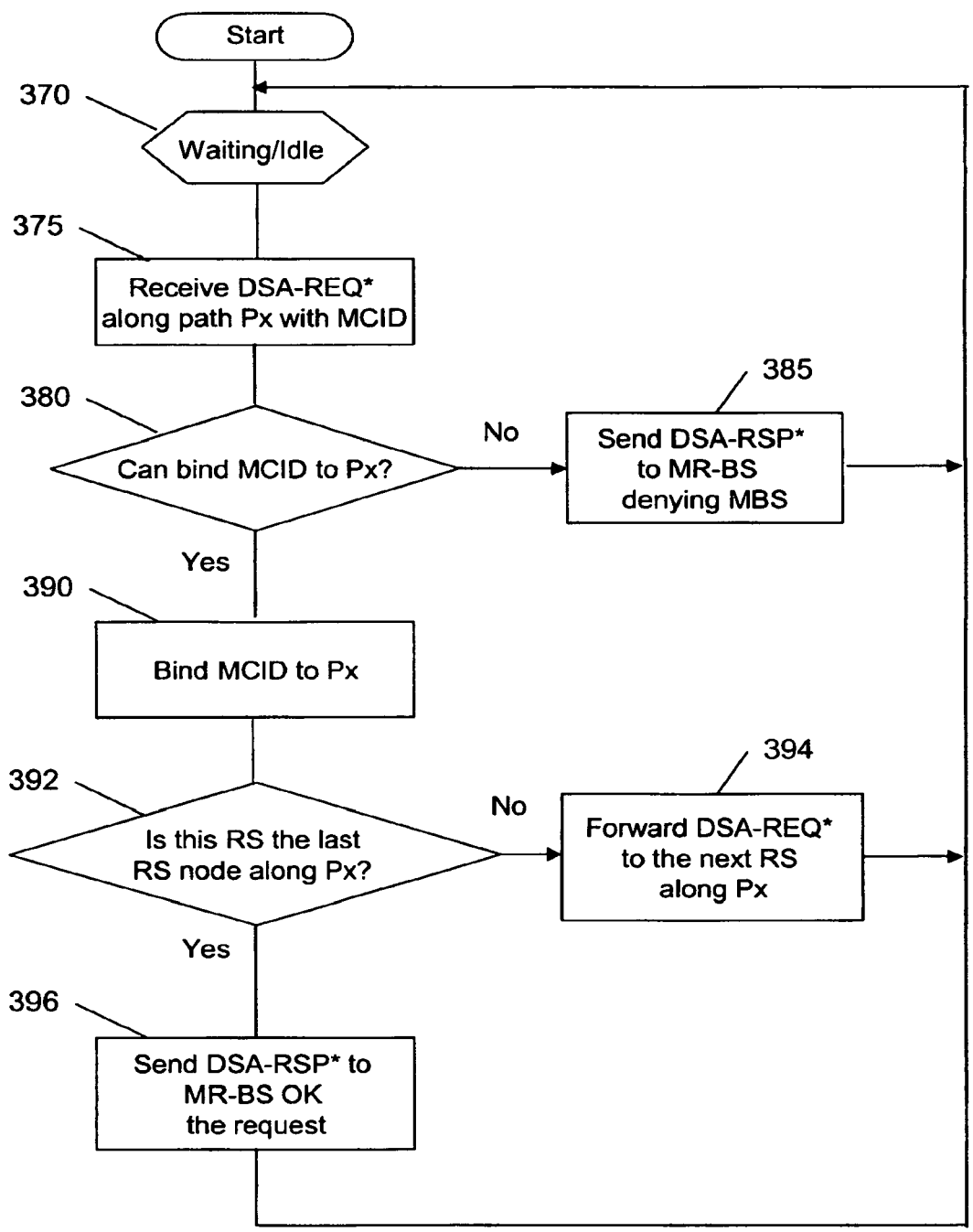
FIG. 3B is a flowchart of the method in accordance with the present invention for a relay node/station to add a path to a multicast distribution tree for a multicast and broadcast service.

FIG. 3B shows the action taken by a RS when it receives a DSA-REQ* message along path Px. The RS is in a wait/idle loop 370 until it receives a dynamic service request. The RS receives an enhanced/extended dynamic service request message DSA-REQ* to add a connection along path Px with an MCID from the MR-BS at 375. The RS determines if it can bind the MCID to path Px at 380. If the RS determines that it cannot bind the MCID to path Px, then the RS sends an enhanced/extended dynamic response message DSA-RSP* to the MR-BS denying MBS at 385. The method of the present invention then returns to wait/idle state 370. If the RS determines that it can bind the MCID to path Px, then it binds the MCID to path Px at 390. The RS then determines if it is the last RS along path Px at 392. If the RS is not the last RS along path Px then the RS forwards the enhanced/extended dynamic service request message DSA-REQ* to the next RS along path Px at 394. The method of the present invention then returns to wait/idle state 370. If the RS determines that it is the last RS along path Px, then the RS sends an enhanced/extended dynamic service response message DSA-RSP* to the MR-BS indicating that the request for path Px to be added to the multicast distribution tree has been performed and that the MCID has been bound to path Px at 396. The method of the present invention then returns to wait/idle state 370.

Figure 4:
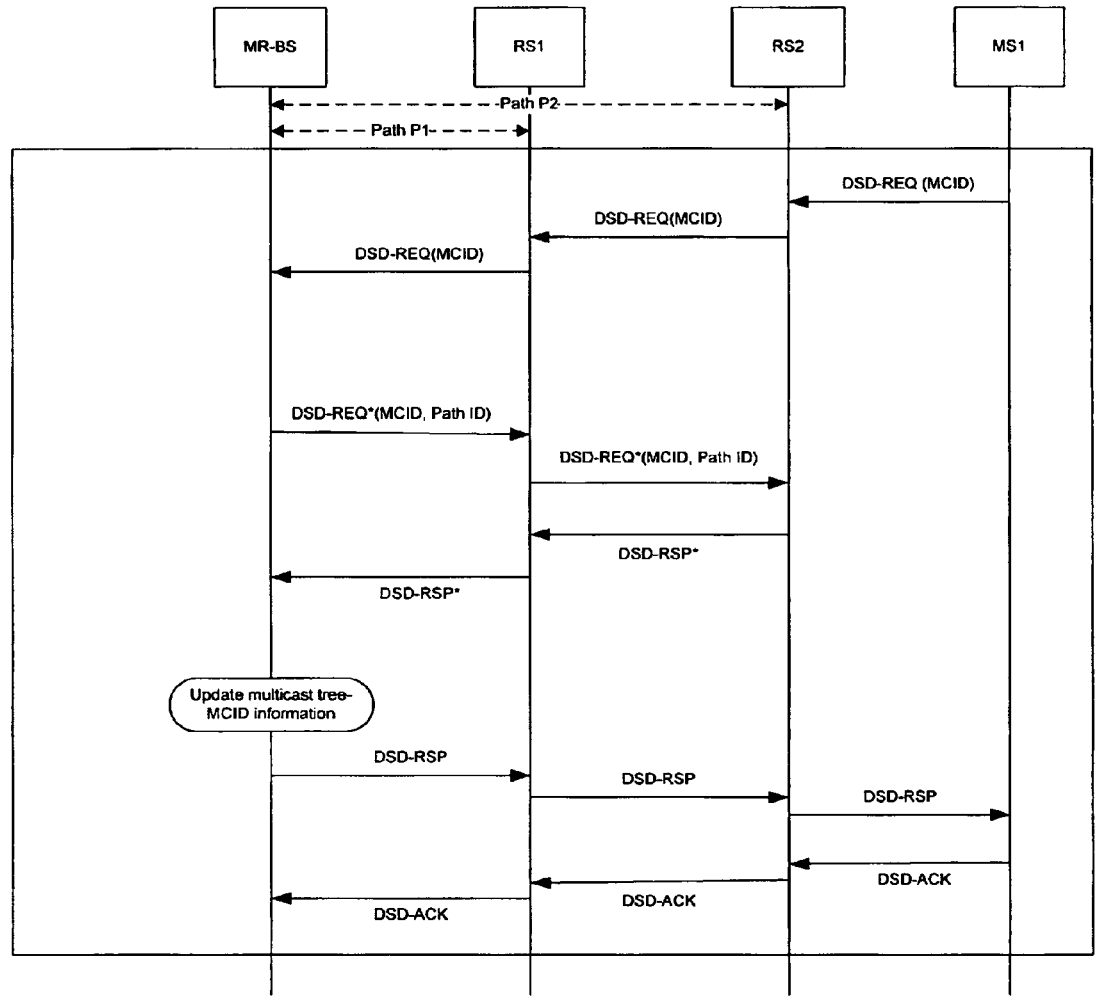
FIG. 4 is a message flow/ladder diagram to delete a path from a multicast distribution tree in accordance with an exemplary embodiment of the present invention.

FIG. 4 is a message flow/ladder diagram to delete a path from a multicast distribution tree in accordance with an exemplary embodiment of the present invention. When a MS needs to leave the multicast application, the MS sends a DSD-REQ (including the MCID) to the MR-BS to request deleting it from the multicast service flow. The DSA-REQ request is received by its attached/associated RS and forwarded to MR-BS along path Px between the RS and MR-BS. The MR-BS determines if the path can be removed from the tree-MCID. If path Px cannot be removed from the tree-MCID then this information is communicated between the MR-BS and the MS using legacy service flow messages. The MR-BS decreases the number of MSs that have requested the MBS along the path that the MR-BS received the DSD-REQ. If the decreased number of MSs using this path for the MBS has not reached to 0, the MR-BS only sends a DSD-RSP to that MS and the MS acknowledges with a DSA-ACK message. No further action is taken. If the number becomes 0, the MR-BS sends a DSD-REQ* along path Px. The DSA-REQ* message includes the MCID, multicast distribution tree information and the path identification. Upon receiving the DSD-REQ* message, each RS along path Px unbinds the MCID from the path Px. If the RS is not the last RS along the path, it forwards the DSD-REQ* message to the next hop RS along the path Px. The last RS along path Px then sends a DSD-RSP* to the MR-BS after unbinding the MCID from the path Px. The MR-BS deletes path Px from the tree-MCID. The legacy service flow messages are followed between the MR-BS and the MS requesting MBS deletion. The MR-BS sends a DSD-RSP to the requesting MS and the MS acknowledges the DSD-RSP message with a DSA-ACK message. This last set of legacy service flow messages are also followed the tree-MCID information update between the MR-BS and the requesting MS in the event that path Px cannot be deleted from tree-MCID.

For an example, for multicast distribution tree tree-MCID={MCID, 2, (P2, 2), (P4,1)}, when MS2 sends a DSD-REQ with MCID to MR-BS along path P2 to request deleting it from the MBS flow, the MR-BS first updates the number and identification information of the MSs that are receiving the MBS along path P2. The updated multicast distribution tree information becomes tree-MCID={MCID, 1, (P2,1), (P4,1)}. Because there is still a MS that receives MBS along path P2, the MR-BS sends a DSD-RSP to MS2 and MS2 acknowledges the DSD-RSP message with a DSA-ACK message. No further action is taken for RSs along path P2. If MS1 later sends a DSD-REQ to the MR-BS with MCID, the MR-BS update the tree information to tree-MCID={MCID, 2, (P2,0), (P4,1)}. The MR-BS determines that no MS is receiving the MBS of MCID along path P2, so the MR-BS sends a DSD-REQ* with MCID along path P2. Each RS along path P2 unbinds the MCID from path P2. A DSD-RSP* is then returned to the MR-BS. The MR-BS deletes path P2 from the multicast distribution tree. The multicast distribution tree becomes tree-MCID={MCID, 1, (P4, 1)}. The MR-BS then sends a DSD-RSP to MS1. MS1 then sends a DSD-ACK message to the MR-BS.

Figure 5A:
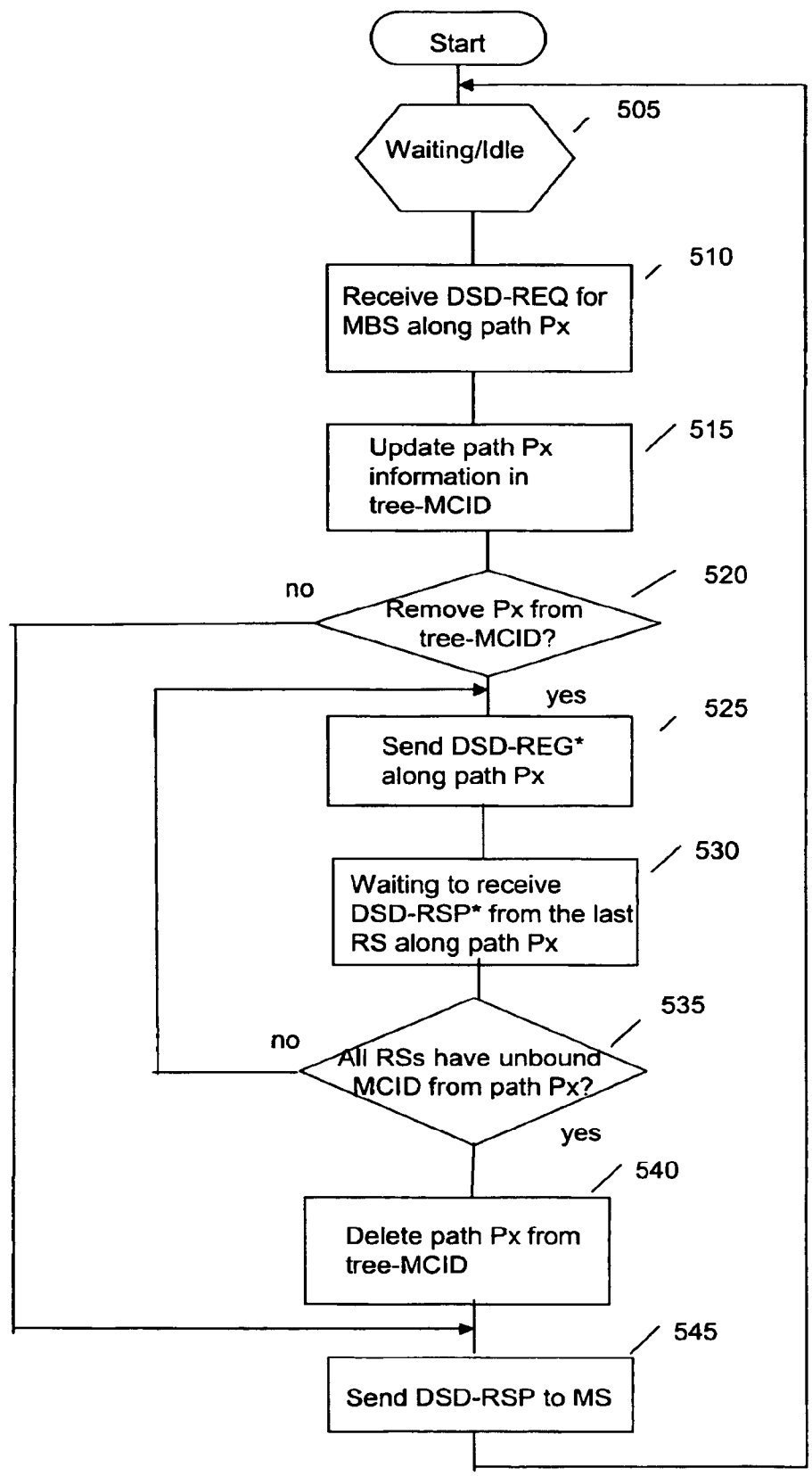
FIG. 5A is a flowchart of the method in accordance with the present invention for a multi-hop relay base station to delete a path from a multicast distribution tree for a multicast and broadcast service.

FIG. 5A is a flowchart of the method for a multi-hop relay base station to delete a path from a multicast distribution tree. The MR-BS is in a wait/idle loop 505 until it receives a dynamic service request. A DSD-REQ message indicating that a MS wants to leave a multicast application (MBS) is received by the MR-BS at 510. The MR-BS updates path Px information in the tree-MCID including decreasing the number of MSs that have requested the MBS along path Px at 515. A determination is made at 520 if path Px should be removed from the tree-MCID. For example, if any MSs requiring this MBS remain along path Px, then the method sends a DSD-RSP to those MSs and returns to the idle state/wait loop at 505. If, however, no MSs requiring this MBS remain along path Px, then the MR-BS sends a DSD-REQ* message to the RSs along path Px at 525. The DSD-REQ* message includes the MCID, multicast distribution tree information and the path identification. The MR-BS waits to receive the DSD-RSP* message along path Px at 530. Upon receipt of the DSD-RSP* message along path Px, the MR-BS deletes path Px from the tree-MCID at 540. The MR-BS then sends a DSD-RSP to the MS at 545. The MS then sends a DSD-ACK message to the MR-BS (not shown).

Figure 5B:
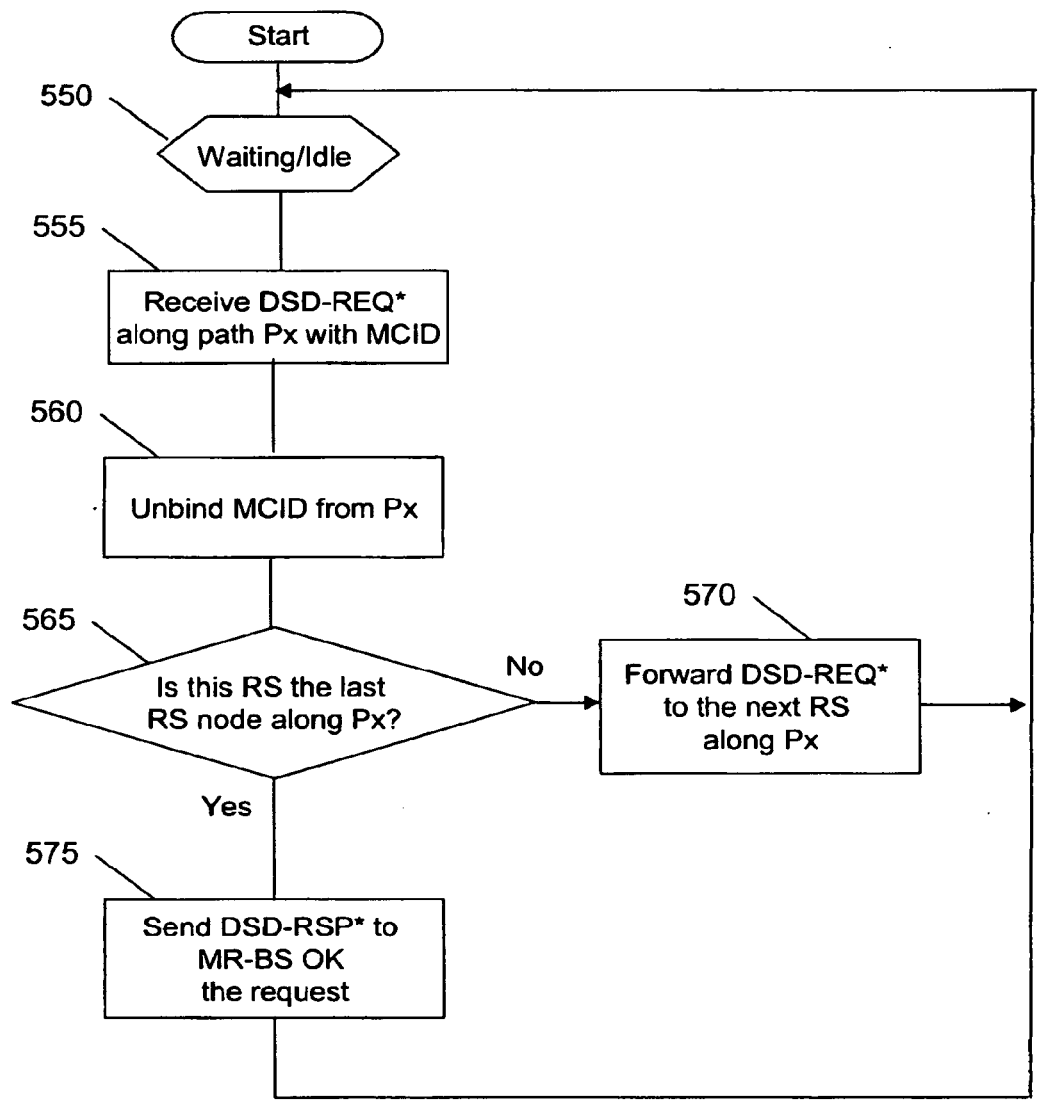
FIG. 5B is a flowchart of the method in accordance with the present invention for a relay node/station to delete a path from a multicast distribution tree for a multicast and broadcast service.

FIG. 5B shows the response when a RS receives a DSD-REQ* from MR-BS to unbind the MCID and the path. The RS is in a wait/idle loop 550 until it receives a dynamic service request. The RS receives an enhanced/extended dynamic service request message DSD-REQ* to delete a connection along path Px with the MCID at 555. The RS then unbinds the MCID from path Px at 560. The RS then makes a determination if the RS is the last RS along path Px at 565. If the RS is not the last RS along path Px, then the enhanced/extended dynamic service, request DSD-REQ* is forwarded to the next RS along path Px at 570. The method of the present invention then returns to wait/idle state 550. If the RS determines that it is the last RS along path Px, then the RS sends an enhanced/extended dynamic service response message DSD-RSP* to the MR-BS indicating that the connection has been deleted and then the MCID has been unbound from path Px at 575. The method of the present invention then returns to wait/idle state 550.

When the parameters for a multicast service flow change, a MR-BS or MS may also sends a DSC-REQ message to update these changes. All the RSs in the multicast distribution tree of the MBS are informed of these changes. This is achieved by MR-BS sending a DSC-REQ* message to all of the RSs along all the paths in the multicast distribution tree. In the example of FIG. 1, if the parameters for the MCID service flow have changed, the MR-BS sends DSC-REQ* along paths P2 and P4. All of the RSs along P2 and P4 update the service flow parameters for the MCID. The last RS of the path sends an enhanced/extended dynamic service response message DSC-RSP* to the MR-BS indicating that the service flow parameters for the MCID have been changed to satisfy the request to change the multicast service flow parameters in the DSC-REQ. If a RS along the path can not change the service flow parameters for the MCID to satisfy the request contained in the DSC-REQ*, it sends a DSC-RSP* to the MR-BS to deny the request.

In an alternative embodiment, each multicast distribution tree is also associated with a unique multicast CID. The multicast distribution tree, however, consists of branches/links. A branch/link connects a MR-BS or a RS with a neighbor RS. Each branch also has a number associated with it to indicate the number of MSs using this branch for the MBS as well as the identification information of the MSs using this branch for the MBS. This information can be derived from the path along which a MS is connected to MR-BS. The multicast distribution tree is constructed and maintained by the MR-BS. For each MCID, the MR-BS and RSs keep a list of their child nodes/devices and the basic and primary CIDs of their children corresponding to the tree-MCID. The RS of the tree-MCID also has information whether any of its attached MSs is receiving the MBS. The RS may also have information about the number and identification information of MSs that attach to this RS for the MBS. The RS may also have a list of the MSs and the basic and primary CIDs of the MSs that are attached to this RS for the MBS. The information is communicated to the RSs by the MR-BS using the extended DSx messages. The information is used later by the MR-BS and RSs for scheduling when they forward multicast SDUs associated with this MCID. Using the same example as the above to show how the alternative embodiment works.

When MS1 sends a DSA-REQ to the MR-BS requesting a MBS, the MR-BS assigns an available multicast CID (MCID) from the CID space. The MR-BS knows that MS1 is connected along path P2 and sends a DSA-REQ* message to each RS along path P2. In the DSA-REQ* message, the MR-BS informs each RS of the list of its child nodes/devices corresponding to the tree-MCID and the basic and primary CIDs of the child nodes/devices. Each RS then updates the information corresponding to the tree-MCID and sends a DSA-RSP* to the MR-BS. For example, the MR-BS sends a DSA-REQ* message to RS1 to inform RS1 that for tree-MCID, the RS1's child is RS2. The MR-BS also informs RS1 of the basic and primary management CID of RS2. The MR-BS informs the RS that its attached MS is receiving the MBS. The MR-BS also informs the RS of the number of MSs that are attached to this RS for the MBS. The MR-BS also informs the RS of the list of the MSs and the basic and primary CIDs of the MSs that are attached to this RS for the MBS. In this example, the MR-BS informs RS2 of this information. When the MR-BS has received the DSA-RSP* from each of the RSs, it constructs the tree as tree-MCID={(MR-BS, RS1, 1), (RS1, RS2, 1)}. This information is derived from the information of path P2, the MR-BS then sends a DSA-RSP to MS1.

When MS2 sends a DSA-REQ request to join the multicast application, because no new branch is added to the multicast distribution tree, the MR-BS only updates the number and identification information of MSs associated with each branch. The multicast distribution tree is, thus, updated to tree-MCID={(MR-BS, RS1, 2), (RS1, RS2, 2)}. The MR-BS sends a DSA-REQ* message to RS2 to inform RS2 that MS2 is to receive MBS with identification number of MCID. The MR-BS then sends a DSA-RSP message to MS2.

When MS3 sends a DSA-REQ request requiring the same MBS, the MR-BS sends a DSA-REQ* to RS1, RS3 and RS4, respectively, to update the multicast distribution tree. In these DSA-REQ* messages, the MR-BS inform RS1 that for tree-MCID, RS1's children are RS2 and RS3, RS3's child is RS4. It also informs RS4 that MS3 is to receive MBS with identification number of MCID. Upon receiving all the DSA-RSP* messages from RS1, RS3 and RS4, the multicast distribution tree is updated to tree-MCID={(MR-BS, RS1, 3), (RS1, RS2, 2), (RS1, RS3, 1), (RS3, RS4, 1)}. Note that branches (RS1, RS3) and (RS3, RS4) are added to the multicast distribution tree. Also the number associated with branch (MR-BS, RS1) is updated. The MR-BS then sends a DSA-RSP message to MS3.

When MS2 sends a DSD-REQ to leave the multicast application, the multicast distribution tree is updated to tree-MCID={(MR-BS, RS1, 2), (RS1, RS2, 1), (RS1, RS3,1), (RS3, RS4, 1)}. Because all existing branches remain in the multicast distribution tree, no further action is taken to change the multicast distribution tree structure by the MR-BS. The MR-BS sends a DSD-REQ* to RS2 to inform RS2 to delete MS2 from the MCID connection. The RS2 sends a DSD-RSP* to the MR-BS to indicate that the MS2 has been deleted from the MCID connection. The MR-BS then sends a DSD-RSP message to MS2.

When MS3 sends a DSD-REQ to leave the multicast application, the multicast distribution tree is updated to tree-MCID={(MR-BS, RS1, 1), (RS1, RS2, 1), (RS1, RS3,0), (RS3, RS4, 0)}. As the number of MSs associated with branches (RS1, RS3) and (RS3, RS4) reaches to 0, the MR-BS send a DSD-REQ* to RS1, RS3 and RS4. RS3 and RS4 delete the record for tree-MCID, upon receiving DSD-RSP* from RS1, RS3 and RS4, MR-BS update the multicast distribution tree information to tree-MCID={(MR-BS, RS1, 1), (RS1, RS2, 1)}. The MR-BS then sends a DSD-RSP message to MS3.

The processing of DSC information is the same as in scheme 1 except that each RS receiving the DSC-REQ* (instead of the last RS of the path) sends an enhanced/extended dynamic service response message DSC-RSP* to the MR-BS indicating that the service flow parameters for the MCID have been changed to satisfy the request to change the multicast service flow parameters transmitted in the DSC-REQ*.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for multicast communications in a multi-hop relay network, said method comprising:
   receiving a message requesting multicast and broadcast service along said path connection;
   sending, by a multi-hop relay base station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;
   receiving, by said multi-hop relay base station, an extended response message, wherein said extended response message is one of a response to said extended request message for an addition of a path connection, a response to said extended request message for a deletion of said path connection and a response to said extended request message to change service flow parameters of said path connection;
   adding said path connection to said multicast distribution tree, if said request message is for said addition of said path connection; and further wherein said adding act further comprises;
      determining if said request message for multicast and broadcast service can be accepted;
      determining if said multicast connection identification has already been assigned, if said request message for said multicast and broadcast service can be accepted;
      creating a multicast connection, assigning said multicast connection identification to said multicast connection and creating a multicast distribution tree if said multicast connection identification has not already been assigned;
      determining if said path connection is already included in said multicast distribution tree, if said multicast connection identification has already been assigned;
      updating said multicast tree information if said path connection is included in said multicast distribution tree information;
      attempting to bind said path connection to said multicast connection identification;
      determining if said path connection has been bound to said multicast connection identification;
      sending a multicast and broadcast service denial message if one of said path connection has not been bound to said multicast connection identification and said request message for said multicast and broadcast service cannot be accepted; and
      adding said path connection to said multicast distribution tree;
   recording a number of end devices and identification information for said end devices that require said multicast and broadcast service;
   sending a response message; and
   receiving an acknowledgment.

2. The method according to claim 1, wherein said multi-hop relay network is a mobile wireless multi-hop relay communications network.

3. The method according to claim 1, further comprising updating said service flow parameters for said multicast connection identification.

4. A method for multicast communications in a multi-hop relay network, said method comprising:
   receiving a message requesting multicast and broadcast service along said path connection;
   sending, by a multi-hop relay base station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;
   receiving, by said multi-hop relay base station, an extended response message, wherein said extended response message is one of a response to said extended request message for an addition of a path connection, a response to said extended request message for a deletion of said path connection and a response to said extended request message to change service flow parameters of said path connection;
   deleting said path connection from said multicast distribution tree, if said request message is for said deletion of said path connection; and further wherein said deleting act further comprises;
      updating information for said path connection in a multicast distribution tree;
      determining if said path connection has been unbound from said multicast connection identification; and
      determining if any end devices remain that require said multicast and broadcast service;
   sending a response message; and
   receiving an acknowledgment.

5. The method according to claim 4, wherein said multi-hop relay network is a mobile wireless multi-hop relay communications network.

6. The method according to claim 4, further comprising updating said service flow parameters for said multicast connection identification.

7. An apparatus for multicast communications in a multi-hop relay network, comprising:
   means for receiving a message requesting multicast and broadcast service along said path connection;
   means for sending, by a multi-hop relay base station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;

means for receiving, by said multi-hop relay base station, an extended response message, wherein said extended response message is one of a response to said extended request message for an addition of a path connection, a response to said extended request message for a deletion of said path connection and a response to said extended request message to change service flow parameters of said path connection;

means for adding said path connection to said multicast distribution tree, if said request message is for said addition of said path connection; and further wherein said means for adding further comprises;

means for determining if said request message for multicast and broadcast service can be accepted;

means for determining if said multicast connection identification has already been assigned, if said request message for said multicast and broadcast service can be accepted;

means for creating a multicast connection, assigning said multicast connection identification to said multicast connection and creating a multicast distribution tree if said multicast connection identification has not already been assigned;

means for determining if said path connection is already included in said multicast distribution tree, if said multicast connection identification has already been assigned;

means for updating said multicast tree information if said path connection is included in said multicast distribution tree information;

means for attempting to bind said path connection to said multicast connection identification;

means for determining if said path connection has been bound to said multicast connection identification;

means for sending a multicast and broadcast service denial message if one of said path connection has not been bound to said multicast connection identification and said request message for said multicast and broadcast service cannot be accepted; and means for adding said path connection to said multicast distribution tree;

means for recording a number of end devices and identification information for said end devices that require said multicast and broadcast service;

means for sending a response message; and means for receiving an acknowledgment.

8. The apparatus according to claim 7, wherein said multi-hop relay network is a mobile wireless multi-hop relay communications network.

9. The apparatus according to claim 7, further comprising updating said service flow parameters for said multicast connection identification.

10. An apparatus for multicast communications in a multi-hop relay network, comprising:

means for receiving a message requesting multicast and broadcast service along said path connection;

means for sending, by a multi-hop relay base station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;

means for receiving, by said multi-hop relay base station, an extended response message, wherein said extended response message is one of a response to said extended request message for an addition of a path connection, a response to said extended request message for a deletion of said path connection and a response to said extended request message to change service flow parameters of said path connection;

means for deleting said path connection from said multicast distribution tree, if said request message is for said deletion of said path connection; and further wherein said means for deleting further comprises;

means for updating information for said path connection in a multicast distribution tree;

means for determining if said path connection has been unbound from said multicast connection identification; and means for determining if any end devices remain that require said multicast and broadcast service;

means for sending a response message; and means for receiving an acknowledgment.

11. The apparatus according to claim 10, wherein said multi-hop relay network is a mobile wireless multi-hop relay communications network.

12. The apparatus according to claim 10, further comprising updating said service flow parameters for said multicast connection identification.

13. A method for multicast communications in a multi-hop relay network, said method comprising:

receiving a message requesting multicast and broadcast service along a path connection;

forwarding said request message for multicast and broadcast service along said path connection;

receiving, by a relay station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;

forwarding said extended request message along said path connection;

adding said path connection to said multicast distribution tree, if said request message is for said addition of said path connection; and further wherein said adding act further comprises;

determining if said multicast connection identification can be bound to said path identification;

sending said extended response message denying said request message for multicast and broadcast service, if said multicast connection identification cannot be bound to said path identification;

binding said multicast connection identification to said path identification;

sending, by a relay station, an extended response message, wherein said extended response message is one of a response to said extended request message for an addition of a path connection, a response to said extended request message for a deletion of said path connection and a response to said extended request message to change service flow parameters of said path connection;

receiving a response message;

forwarding said response message along said path connection;

receiving an acknowledgment; and
forwarding said acknowledgement along said path connection.

14. The method according to claim 13, wherein said multi-hop relay network is a mobile wireless multi-hop relay communications network.

15. The method according to claim 13, further comprising updating said service flow parameters for said multicast connection identification.

16. A method for multicast communications in a multi-hop relay network, said method comprising:
receiving a message requesting multicast and broadcast service along a path connection;
forwarding said request message for multicast and broadcast service along said path connection;
receiving, by a relay station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;
forwarding said extended request message along said path connection;
deleting said path connection from said multicast distribution tree, if said request message is for said deletion of said path connection; and further wherein said deleting act further comprises;
unbinding said multicast connection identification from said path identification; and
forwarding said extended request message along said path connection sending, by a relay station, an extended response message, wherein said extended response message is one of a response to said extended request message for an addition of a path connection, a response to said extended request message for a deletion of said path connection and a response to said extended request message to change service flow parameters of said path connection;
receiving a response message;
forwarding said response message along said path connection;
receiving an acknowledgment; and
forwarding said acknowledgement along said path connection.

17. The method according to claim 16, wherein said multi-hop relay network is a mobile wireless multi-hop relay communications network.

18. The method according to claim 16, further comprising updating said service flow parameters for said multicast connection identification.

19. An apparatus for multicast communications in a multi-hop relay network, comprising:
means for receiving a message requesting multicast and broadcast service along a path connection;
means for forwarding said request message for multicast and broadcast service along said path connection;
means for receiving, by a relay station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;
means for forwarding said extended request message along said path connection;
means for adding said path connection to said multicast distribution tree, if said request message is for said addition of said path connection; and further wherein said means for adding further comprises;
means for determining if said multicast connection identification can be bound to said path identification;
means for sending said extended response message denying said request message for multicast and broadcast service, if said multicast connection identification cannot be bound to said path identification;
means for binding said multicast connection identification to said path identification;
means for sending, by a relay station, an extended response message, wherein said extended response message is one of a response to said extended request message for an addition of a path connection, a response to said extended request message for a deletion of said path connection and a response to said extended request message to change service flow parameters of said path connection;
means for receiving a response message;
means for forwarding said response message along said path connection;
means for receiving an acknowledgment; and
means for forwarding said acknowledgement along said path connection.

20. The apparatus according to claim 19, wherein said multi-hop relay network is a mobile wireless multi-hop relay communications network.

21. The apparatus according to claim 19, further comprising updating said service flow parameters for said multicast connection identification.

22. An apparatus for multicast communications in a multi-hop relay network, comprising:
means for receiving a message requesting multicast and broadcast service along a path connection;
means for forwarding said request message for multicast and broadcast service along said path connection;
means for receiving, by a relay station, an extended request message, wherein said extended request message includes a multicast connection identification, multicast distribution tree information and a path identification, wherein said extended request message is one of a request for an addition of said path connection, a request for a deletion of said path connection and a request to change quality of service information of said path connection, and further wherein said extended request message optionally includes service flow parameters;
means for forwarding said extended request message along said path connection;
means for deleting said path connection from said multicast distribution tree, if said request message is for said deletion of said path connection; and further wherein said means for deleting further comprises;
means for unbinding said multicast connection identification from said path identification; and
means for forwarding said extended request message along said path connection
means for sending, by a relay station, an extended response message, wherein said extended response message is one of a response to said extended request message for an addition of a path connection, a response to said extended request message for a deletion of said path connection and a response to said extended request message to change service flow parameters of said path connection;

means for receiving a response message;

means for forwarding said response message along said path connection;

means for receiving an acknowledgment; and means for forwarding said acknowledgement along said path connection.

23. The apparatus according to claim 22, wherein said multi-hop relay network is a mobile wireless multi-hop relay communications network.

24. The apparatus according to claim 22, further comprising updating said service flow parameters for said multicast connection identification.

* * * * *